US012413765B2

(12) United States Patent
Lv et al.

(10) Patent No.: US 12,413,765 B2
(45) Date of Patent: Sep. 9, 2025

(54) VIDEO WATERMARK ENCODING METHOD AND DECODING METHOD

(71) Applicant: SHANGHAI BILIBILI TECHNOLOGY CO., LTD., Shanghai (CN)

(72) Inventors: Kexing Lv, Shanghai (CN); Shunxin Xu, Shanghai (CN); Chao Cheng, Shanghai (CN)

(73) Assignee: SHANGHAI BILIBILI TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 18/799,960

(22) Filed: Aug. 9, 2024

(65) Prior Publication Data
US 2025/0056030 A1 Feb. 13, 2025

(51) Int. Cl.
H04N 7/12 (2006.01)
H04N 19/119 (2014.01)
H04N 19/467 (2014.01)

(52) U.S. Cl.
CPC ......... H04N 19/467 (2014.11); H04N 19/119 (2014.11)

(58) Field of Classification Search
CPC .................................................. H04N 19/467
See application file for complete search history.

(56) References Cited

U.S. PATENT DOCUMENTS 9,959,586 B1 * 5/2018 Yu .................. H04N 19/467

* cited by examiner

Primary Examiner — Y Lee
(74) Attorney, Agent, or Firm — BakerHostetler

(57) ABSTRACT

This application provides techniques of processing video frames. The techniques comprise obtaining a target frame of a video; capturing at least one to-be-processed image from the target frame, wherein the at least one to-be-processed image comprises at least one segment of the target frame; generating a plurality of channels by performing channel decomposition on the to-be-processed image, wherein the plurality of channels comprise a first channel and a second channel; embedding watermark information indicative of a watermark into the first channel; embedding location information into the second channel, wherein the location information indicates a location of the watermark in the target frame; generating a target image corresponding to the to-be-processed image based on the first channel comprising the embedded watermark information and the second channel comprising the embedded location information; and generating a watermarked video by embedding the target image into the target frame.

16 Claims, 12 Drawing Sheets

S700
Categories of the original anchor points are different, and the categories of the original anchor points include Gaussian-like kernels with different value distributions and different sectors
FIG. 7
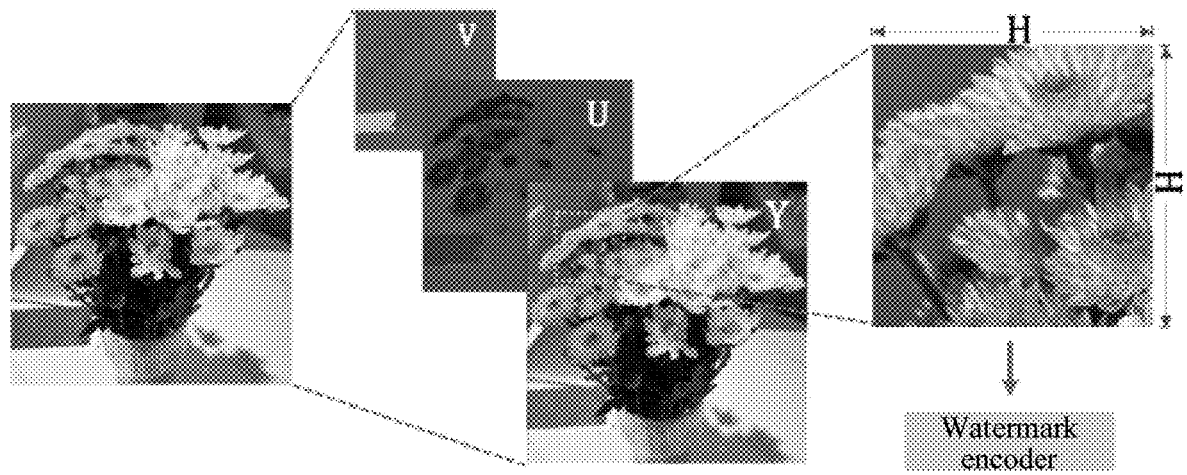
FIG. 8
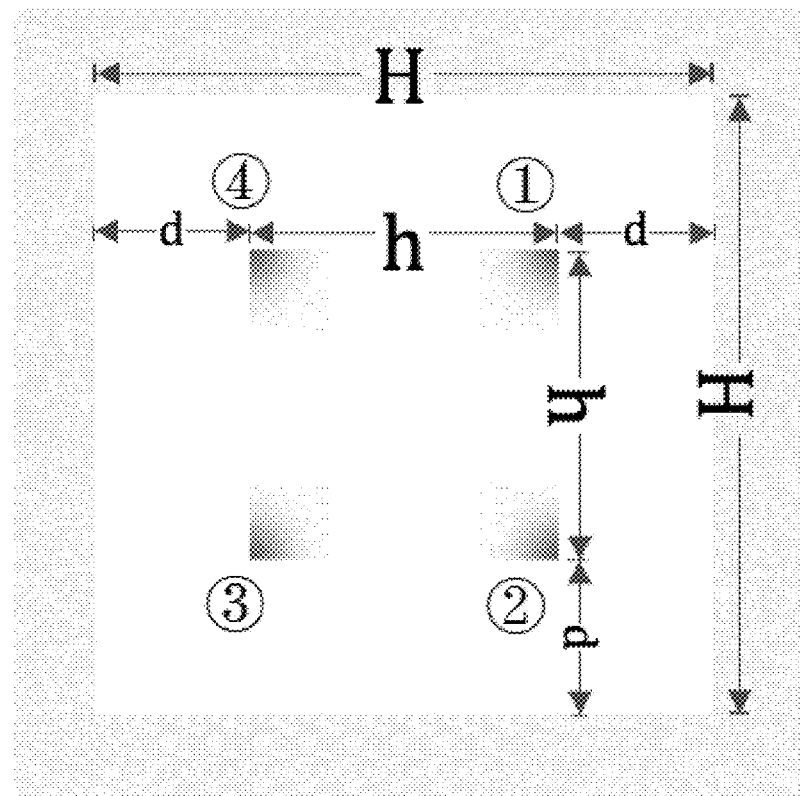
FIG. 9

[Figure: grid of values, mostly 1.00 with darker cells containing lower values]
FIG. 10
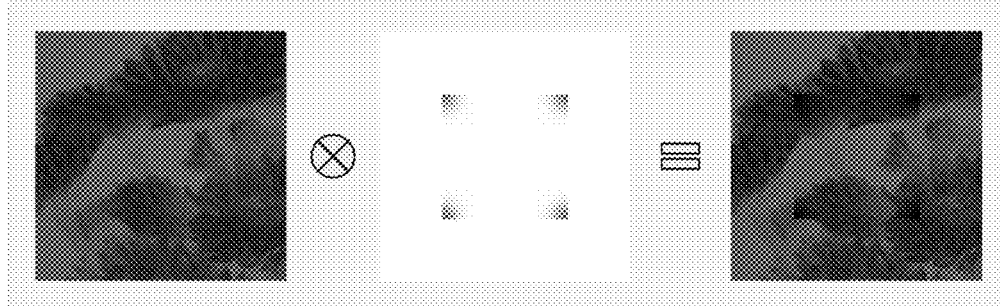
FIG. 11
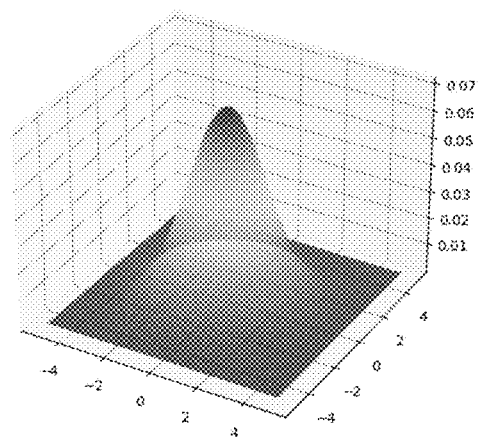
FIG. 12

VIDEO WATERMARK ENCODING METHOD AND DECODING METHOD

CROSS-REFERENCE TO RELATED APPLICATION

The present disclosure claims priority to Chinese Patent Application No. 202311008088.7, filed on Aug. 10, 2023, which is incorporated herein by reference in its entirety.

TECHNICAL FIELD

Embodiments of this application relate to the field of video watermarking technologies, and in particular, to video watermark encoding and decoding methods and apparatuses, a computer device, and a computer-readable storage medium.

BACKGROUND

With development of technologies, infringements such as copying and tampering with video content have become easier. On various video platforms, there are many infringements such as unauthorized reproduction, secondary editing, and publishing videos to other platforms. These infringements damage rights and interests of content creators and video platforms. How to protect legitimate interests of content creators and video platforms has become a major issue to be resolved.

SUMMARY

Embodiments of this application provide video watermark encoding and decoding methods and apparatuses, a computer device, and a computer-readable storage medium, to resolve or alleviate one or more of the foregoing technical problems.

An aspect of the embodiments of this application provides a video watermark encoding method, and the method includes:
  obtaining a target frame image of a video;
  capturing a to-be-processed image from the target frame image, where the to-be-processed image is a local image block of the target frame image;
  performing channel decomposition on the to-be-processed image to obtain a plurality of channels, where the plurality of channels include a first channel and a second channel;
  embedding watermark information into the first channel to obtain a first channel including the watermark information;
  embedding location information into the second channel to obtain a second channel including the location information;
  generating a target image corresponding to the to-be-processed image according to the first channel including the watermark information and the second channel including the location information; and
  embedding the target image into the target frame image to obtain a watermarked video.

Optionally, the location information includes anchor point information; and correspondingly, the embedding location information into the second channel to obtain a second channel including the location information includes:
  calibrating the location information of the to-be-processed image by using an original anchor point group, where the original anchor point group includes a plurality of original anchor points, and the original anchor point is used to indicate a relative location of the to-be-processed image in the target frame image.

Optionally, the method further includes determining a circular region formed with the original anchor point as a center;
  dividing the circular region into a plurality of sectors, where the plurality of sectors include a target sector and a remaining sector; and
  retaining a value of the target sector, and setting a value of the remaining sector as a fixed value, where
  both the value retained for the target sector and the fixed value of the remaining sector are stored in the second channel.

Optionally, there are four original anchor points, and the method further includes:
  determining an orientation of each of the original anchor points; and
  respectively selecting a corresponding target sector for each of the original anchor points according to the orientation of each of the original anchor points.

Optionally, the original anchor point is represented in a form of a Gaussian kernel.

Optionally, categories of the original anchor points are different, and the categories of the original anchor points include Gaussian-like kernels with different value distributions and different sectors.

Another aspect of the embodiments of this application provides a video watermark encoding method, and the method includes:
  obtaining a target frame image of a video;
  performing channel decomposition on the target frame image to obtain a plurality of channels, where the plurality of channels include a first channel and a second channel;
  capturing a first image block from the first channel, where the first image block is a local image block in a layer corresponding to the first channel;
  embedding watermark information into the first image block to obtain a first channel including the watermark information;
  capturing a second image block from the second channel, where a location of the second image block corresponds to that of the first image block;
  embedding location information into the second image block to obtain a second channel including the location information; and
  generating a watermarked target frame image according to the first channel including the watermark information and the second channel including the location information.

Another aspect of the embodiments of this application provides a video watermark decoding method, and the method includes:
  obtaining a target frame image of a video, where the target frame image has watermark information loaded in a first channel and location information loaded in a second channel;
  performing channel decomposition on the target frame image to obtain the first channel and the second channel;
  decoding the second channel to obtain the location information, where the location information includes anchor point group information;
  adjusting a layer corresponding to the first channel according to the anchor point group information; and performing watermark decoding on an adjusted layer to obtain the watermark information of the video.

Another aspect of the embodiments of this application provides a video watermark encoding apparatus, and the apparatus includes:

an obtaining means, configured to obtain a target frame image of a video;

a capture means, configured to capture a to-be-processed image from the target frame image, where the to-be-processed image is a local image block of the target frame image;

a decomposition means, configured to perform channel decomposition on the to-be-processed image to obtain a plurality of channels, where the plurality of channels include a first channel and a second channel;

a first embedding means, configured to embed watermark information into the first channel to obtain a first channel including the watermark information;

a second embedding means, configured to embed location information into the second channel to obtain a second channel including the location information;

a generation means, configured to generate a target image corresponding to the to-be-processed image according to the first channel including the watermark information and the second channel including the location information; and a third embedding means, configured to embed the target image into the target frame image to obtain a watermarked video.

Another aspect of the embodiments of this application provides a video watermark decoding apparatus, and the apparatus includes:

an obtaining means, configured to obtain a target frame image of a video, where the target frame image has watermark information loaded in a first channel and location information loaded in a second channel;

a decomposition means, configured to perform channel decomposition on the target frame image to obtain the first channel and the second channel;

a decoding means, configured to decode the second channel to obtain the location information, where the location information includes anchor point group information;

an adjustment means, configured to adjust a layer corresponding to the first channel according to the anchor point group information; and a watermark decoding means, configured to perform watermark decoding on an adjusted layer to obtain the watermark information of the video.

Another aspect of the embodiments of this application provides a computer device, including:

at least one processor; and a memory communicatively connected to the at least one processor, where the memory stores instructions executable by the at least one processor, and the instructions are executed by the at least one processor to enable the at least one processor to perform the method described above.

Another aspect of the embodiments of this application provides a computer-readable storage medium, the computer-readable storage medium stores computer instructions, and the computer instructions are executed by a processor to implement the method described above.

In the embodiments of this application, the foregoing technical solutions can include the following advantages:

The local image block (the to-be-processed image) of the target frame image is captured from the target frame image of the video, and the channel decomposition is performed on the to-be-processed image to obtain the first channel and the second channel. The watermark information is embedded into the first channel to obtain the first channel including the watermark information. In addition, the location information is embedded into the second channel to obtain the second channel including the location information. The target image is generated according to the first channel including the watermark information and the second channel including the location information. The target image is embedded into the target frame image, so that the watermarked video can be obtained. It may be learned that in the embodiments of this application, without changing a video resolution, the watermark information and the location information can be embedded into different channels of the local image in the target frame image, and it is not necessary to embed the watermark information and the location information into the entire target frame image, thereby improving efficiency of adding a watermark to the video (video watermark encoding), and reducing resource and computing power consumption. In other words, efficient video watermark encoding and low computing power consumption can be implemented while ensuring picture quality of the video obtained after the watermark is added.

BRIEF DESCRIPTION OF DRAWINGS

The accompanying drawings show examples of the embodiments and constitute a part of this specification, and together with the descriptions of this specification are used to describe example implementations of the embodiments. The illustrated embodiments are merely used for illustrative purposes and are not intended to limit the scope of the claims. In all the accompanying drawings, the same reference numerals refer to similar but not necessarily the same elements.

FIG. 7 is a schematic flowchart of a sub-step of step S208 in FIG. 2;

FIG. 8 is a schematic diagram of performing channel decomposition on a to-be-processed image and adding watermark information to a first channel according to Embodiment 1 of this application;

FIG. 9 is a schematic diagram of a target sector corresponding to an anchor point according to Embodiment 1 of this application;

FIG. 10 is a schematic diagram of a value situation of a target sector according to Embodiment 1 of this application;

FIG. 11 is a schematic diagram of embedding location information into a second channel according to Embodiment 1 of this application;

FIG. 12 is a schematic diagram of a form of a Gaussian-like kernel;

DESCRIPTION OF EMBODIMENTS

Figure 1:
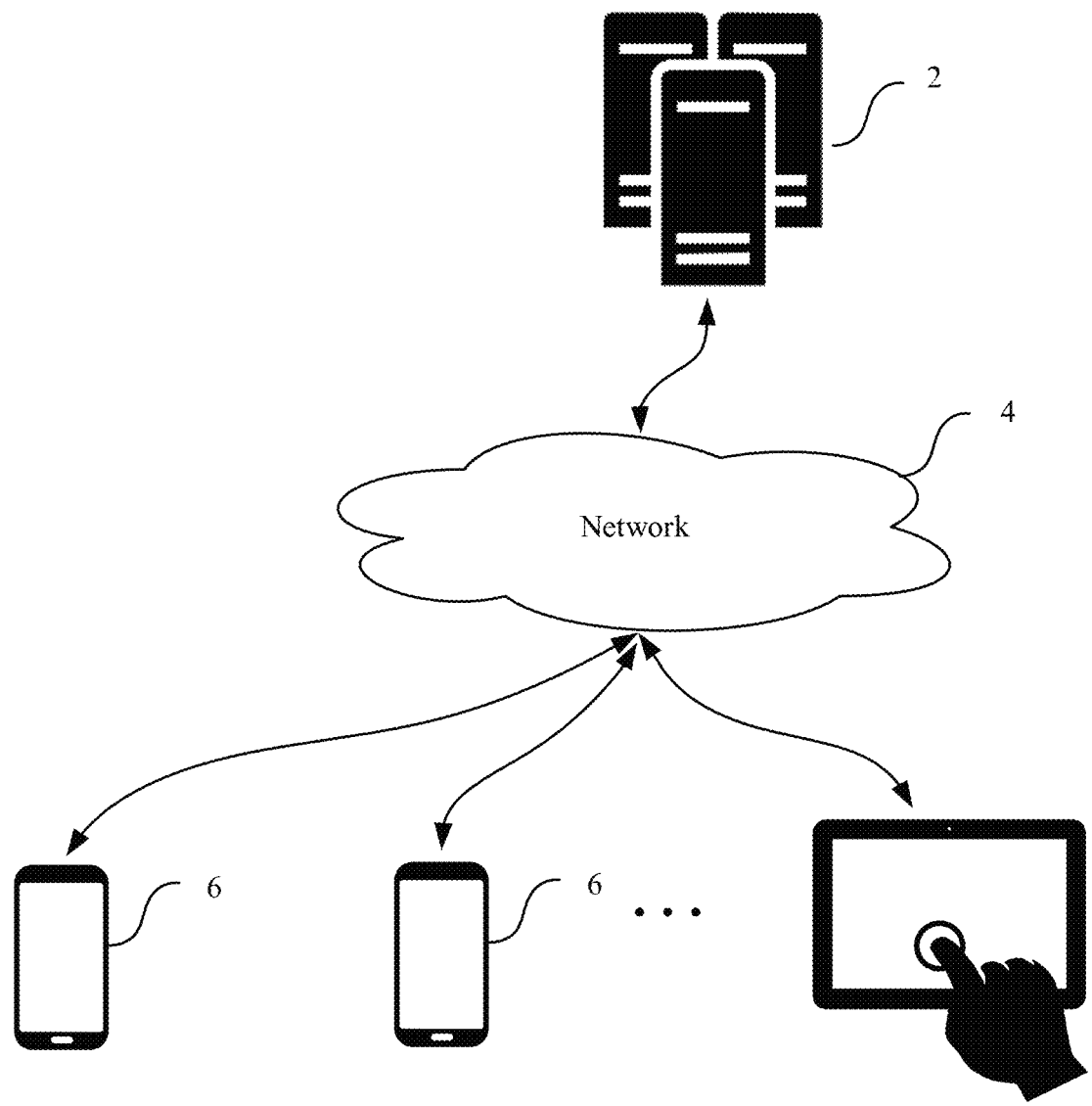
FIG. 1 is a schematic diagram of an operating environment of a video watermark encoding method according to Embodiment 1 of this application.

To make the objectives, technical solutions, and advantages of this application clearer, the following further describes this application in detail with reference to the accompanying drawings and the embodiments. It should be understood that the specific embodiments described herein are merely used to explain this application but are not intended to limit this application. All other embodiments obtained by a person of ordinary skill in the art based on embodiments of this application without creative efforts shall fall within the protection scope of this application.

It should be noted that the descriptions such as "first" and "second" in the embodiments of this application are merely used for description, and shall not be understood as an indication or implication of relative importance or an implicit indication of a quantity of indicated technical features. Therefore, a feature defined with "first" or "second" may explicitly or implicitly include at least one feature. In addition, technical solutions in the embodiments may be combined with each other, provided that a person of ordinary skill in the art can implement the combination. When the combination of the technical solutions is contradictory or cannot be implemented, it should be considered that the combination of the technical solutions does not exist and does not fall within the protection scope of this application.

In the description of this application, it should be understood that digit numbers before steps does not indicate a sequence of performing the steps, and are only used to facilitate description of this application and differentiation of each step, but are not to be construed as a limitation to this application.

First, explanations of terms in this application are provided.

Video digital watermark: An identifier embedded in a video. The video digital watermark may be used for various purposes, including preventing piracy, tracking data leakage, providing copyright information, and the like.

Channel: Different color components or grayscale components of an image. Color information of the image may include a plurality of channels, and each channel corresponds to different color or grayscale information. Channel types of a color image include RGB, YUV, HVS, and the like.

Computing power: Usually, computing power of a device is specifically computing power of a CPU and a GPU.

Watermark encoding: A process of embedding specific information into a digital carrier.

Watermark decoding: A process of parsing specific information from a digital carrier.

Watermark encoding and decoding: refers to two processes of watermark encoding and watermark decoding.

Anchor point: is a specific point or location in an image, has a special significance or use, and may be used to calibrate location information.

Gaussian kernel: is a two-dimensional rectangular matrix, and a value in the matrix meets a two-dimensional Gaussian distribution with a center point as an original point.

Gaussian-like kernel: is a two-dimensional rectangular matrix similar to a Gaussian kernel distribution.

Second, to facilitate a person skilled in the art to understand the technical solutions provided in the embodiments of this application, the following describes related technologies.

There is a large amount of video content on various platforms (such as bilibili). These videos are output of content creators and are a kind of virtual assets. At the same time, however, there are many infringements on the platforms, such as unauthorized reproduction, secondary editing, and publishing videos to other platforms. These infringements damage rights and interests of the content creators and the platforms. Due to a difficulty in protecting rights, these infringements greatly reduce creative enthusiasm of the content creators. Video watermarking technologies have emerged, such as a video digital watermarking technology. The video watermarking technology embeds a watermark into a video image (video digital watermark encoding). After a video is suspected of infringing intellectual property (IP) rights of another video, watermark information can be parsed out from videos to protect the IP rights.

Due to a huge quantity of videos submitted to the video platforms every day, efficiency of video watermark encoding and decoding is relatively low, which cannot meet requirements of users and the platforms. In addition, because it is difficult for the video watermarking technology to consider picture quality obtained after watermark encoding, image quality obtained after watermark encoding is relatively poor. Decoding robustness of a watermark obtained after a plurality of picture quality attacks is relatively low. The video digital watermarking technology known to the inventor has the following disadvantages, specifically:

(1) A speed and computing power consumption of digital watermark encoding are related to a resolution of an image input to an encoding algorithm. A larger image resolution indicates a slower encoding speed and greater computing power consumption. For a high-resolution video, if a digital watermark is to be embedded, because a video resolution is relatively high, efficiency of video digital watermark encoding is low, affecting a video publishing speed. In addition, embedding a digital watermark in the high-resolution video requires a large amount of computing power consumption, and hardware costs are high.

(2) The inventor learns a video digital watermarking technology that can increase an encoding speed and reduce computing power consumption. Specifically, the high-resolution video may be scaled down to a smaller size, and then watermark encoding is performed. During encoding or after encoding, the video is scaled up to an original resolution. The foregoing method is a policy of sacrificing image quality in exchange for an encoding speed and computing power consumption. Although the encoding speed can be increased and the computing power consumption can be reduced, it cannot ensure image quality obtained after watermark encoding, resulting in poor quality of an image obtained after watermark encoding.

(3) A video including watermark information may change in a picture in an infringement process, for example, geometric transformation operations such as scaling, clipping, and rotation are performed on the picture of the video. When a picture location corresponding to the watermark information changes, watermark decoding is relatively difficult, and decoding efficiency is low.

Therefore, embodiments of this application provide a video watermark encoding and decoding technical solution. In this technical solution, (1) different channels in a local/partial image of a video picture are embedded with watermark information and location information, so that a watermark encoding speed can be increased, hardware computing power consumption can be reduced, and it is not necessary to change a video resolution, thereby ensuring the overall picture quality of a video after a watermark is added. In addition, the location information of the watermark may be further embedded to improve robustness of watermark decoding in response to a geometric transformation attack. (2) Efficient digital watermark encoding and decoding are implemented without changing the video resolution. (3) For a watermark encoded video, the embedded watermark location can be still accurately identified and the watermark information can be decoded under attacks of geometric transformations such as scaling, clipping, and rotation. (4) Location information of a to-be-processed image is calibrated by using four or more different categories of anchor points. Each to-be-processed image is embedded with such a group of anchor points. After a geometric transformation, the to-be-processed image may be restored to an original orientation and size by using a detected anchor point group. For details, see the following.

Finally, for case of understanding, the following provides an example operating environment.

As shown in FIG. 1, a diagram of the operating environment includes: a service platform 2, a network 4, and a client 6.

The service platform 2 may include one or more computing devices. The plurality of computing devices may include a virtualized computing instance. The virtualized computing instance may include a virtual machine such as simulation of a computer system, an operating system, or a server. The computing device may load the virtual machine based on a virtual image and/or other data defining a specific software (for example, an operating system, a dedicated application program, a server) used for simulation. As requirements for different types of processing services change, different virtual machines may be loaded and/or terminated on the one or more computing devices. A management program may be implemented to manage use of different virtual machines on a same computing device.

The service platform 2 may be configured to communicate with the client 6 and the like by using the network 4. The network 4 includes various network devices, for example, a router, a switch, a multiplexer, a hub, a modem, a bridge, a repeater, a firewall, and/or a proxy device. The network 4 may include a physical link, such as a coaxial cable link, a twisted-pair cable link, an optical fiber link, and a combination thereof, or a wireless link, such as a cellular link, a satellite link, a Wi-Fi link, and the like.

The service platform 2 may provide services such as image/video watermark embedding, image/video watermark decoding, and location information decoding training, for example, adding a watermark to a video uploaded by a client, or performing watermark decoding on a last video of the client.

The client 6 may be an electronic device that runs an operating system such as Windows, Android™, or iOS, such as a smartphone, a tablet device, a laptop computer, a virtual reality device, a game device, a set-top box, a vehicle-mounted terminal, and a smart television. Based on the foregoing operating system, various application programs may be run, for example, a to-be-watermarked video image is uploaded to the service platform 2. Certainly, the client 6 may also provide a local watermark adding function.

The client 6 may provide/is configured with a user access page, and may be configured to upload a to-be-watermarked video image, a to-be-decoded watermarked video image, and the like.

It should be noted that the foregoing device is an example, and in different scenarios or according to different requirements, a quantity and types of devices are adjustable.

The following describes the technical solutions of this application by using the service platform 2 as an execution body and by using a plurality of embodiments. It should be noted that these embodiments may be implemented in a plurality of different forms, and should not be construed as limited to the embodiments described herein.

Embodiment 1

Figure 2:
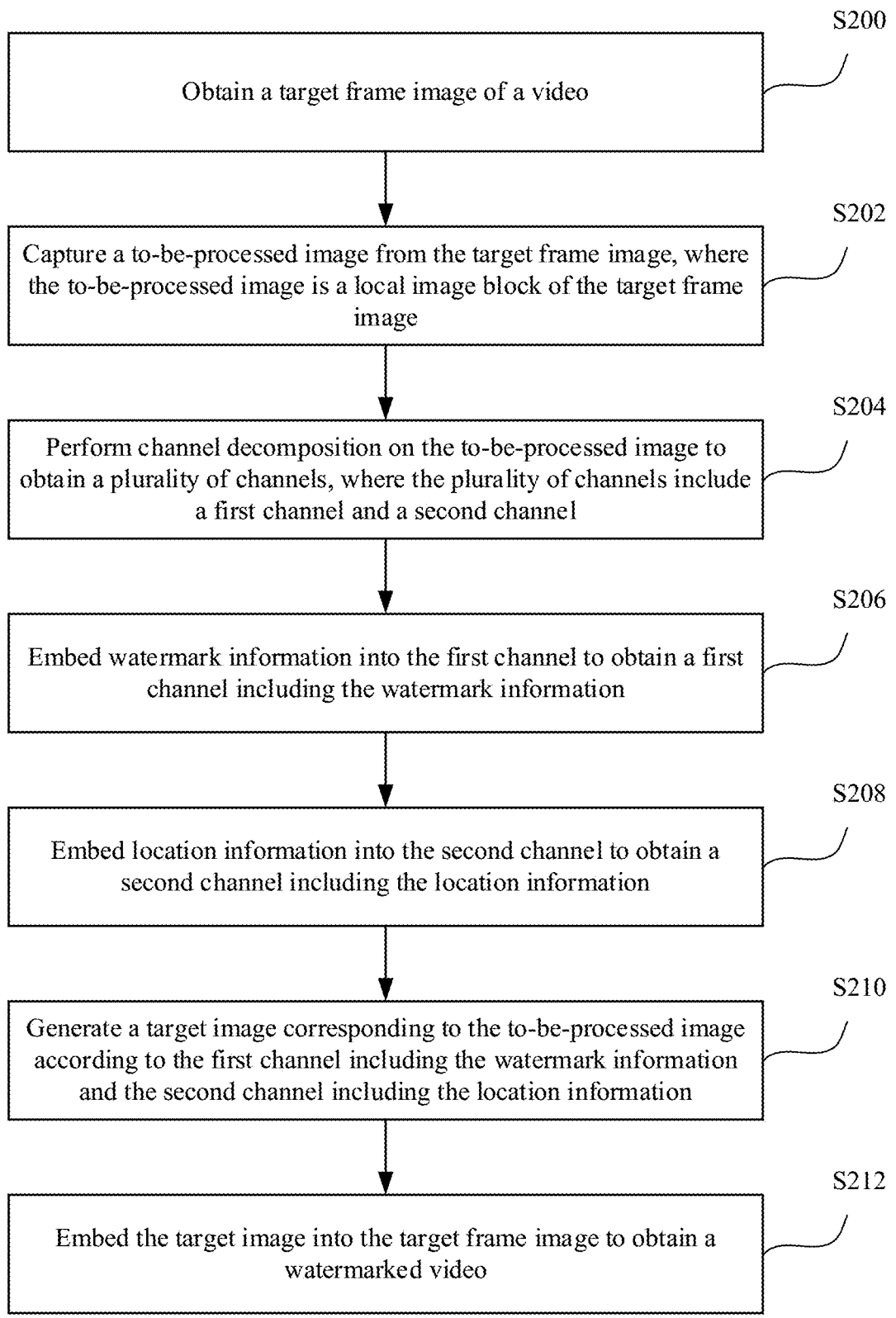
FIG. 2 is a schematic flowchart of a video watermark encoding method according to Embodiment 1 of this application.

FIG. 2 is a schematic flowchart of a video watermark encoding method according to Embodiment 1 of this application.

As shown in FIG. 2, the video watermark encoding method may include steps S200 to S212.

Step S200: Obtain a target frame image (i.e., a target frame) of a video.

Step S202: Capture a to-be-processed image from the target frame, where the to-be-processed image is a local image block of the target frame image (e.g., a part or a segment of the target frame).

Step S204: Perform channel decomposition on the to-be-processed image to obtain a plurality of channels, where the plurality of channels include a first channel and a second channel.

Step S206: Embed watermark information into the first channel to obtain a first channel including the watermark information.

Step S208: Embed location information into the second channel to obtain a second channel including the location information.

Step S210: Generate a target image corresponding to the to-be-processed image based on the first channel including the watermark information and the second channel including the location information.

Step S212: Embed the target image into the target frame image to obtain a watermarked video.

According to the video watermark encoding method provided in this embodiment, channel decomposition is performed on the local image block to obtain the first channel and the second channel. The watermark information is embedded into the first channel to obtain the first channel including the watermark information. In addition, the location information is embedded into the second channel to obtain the second channel including the location information. The target image is generated according to the first channel including the watermark information and the second channel including the location information. The target image is embedded into the target frame image, so that the watermarked video can be obtained.

It may be learned that in this embodiment of this application, without changing a video resolution, the watermark information and the location information can be embedded into different channels of the local image in the target frame image, and it is not necessary to embed the watermark information and the location information into the entire target frame image, thereby improving efficiency of adding a watermark to the video (video watermark encoding), and reducing resource and computing power consumption. In other words, efficient video watermark encoding and low computing power consumption can be implemented while ensuring picture quality of the video obtained after the watermark is added.

With reference to FIG. 2, steps in steps S200 to S212 and optional other steps are described in detail in the following.

Step S200: Obtain a target frame image of a video.

The target frame image is used to add a watermark. Video watermark encoding refers to a process of embedding watermark information into a video image, thereby ensuring invisibility and extractability of a watermark in a video, and minimizing an impact on video quality.

The video may be videos created or uploaded by users on various video sharing platforms. When a user uploads a video to a video sharing platform, the video sharing platform adds a watermark to the uploaded video. The watermark may be a video digital watermark. The video digital watermark may be invisible. An invisible watermark is embedded into a video image in a form that is invisible to naked eyes, thereby ensuring video quality, so that video viewing experience is not affected by the watermark when a user watches the video. The video may be videos in various formats, such as MPEG-4 and AVI.

The target frame image may be any one or more frames in the video. When it is necessary to add a watermark to the video, the watermark may be added to a plurality of frames of the video.

Step S202: Capture a to-be-processed image from the target frame image, where the to-be-processed image is a local image block of the target frame image.

The to-be-processed image refers to a region in the target frame image to which the watermark needs to be added. When the to-be-processed image is captured in the target frame image, one or more local image blocks of a fixed size at any location of the target frame image may be captured. If a plurality of local image blocks are captured, locations of the plurality of local image blocks do not overlap. Further, a quantity and sizes of local image blocks may be determined according to requirements such as a hardware environment and encoding and decoding speeds. When a hardware capability is stronger, there may be more local image blocks, and the size of the local image block may be larger. By capturing a plurality of non-overlapping local image blocks in the target frame image, the watermark is added to the plurality of local image blocks, so that after a watermarked video is attacked by a geometric transformation, valid watermark information can be retained to a greater extent, thereby improving robustness of watermark decoding.

In this embodiment, the local image block is captured from the target frame image, so that when the watermark is added to the video, the watermark only needs to be added to the local image block of the target frame image, and it is not necessary to add the watermark to the entire target frame image, thereby improving efficiency of watermark adding.

Step S204: Perform channel decomposition on the to-be-processed image to obtain a plurality of channels, where the plurality of channels include a first channel and a second channel.

The channel refers to a single color component in the to-be-processed image. For a color image, one image may include a plurality of channels. Specifically, if the to-be-processed image is a color image, the image has a plurality of color channels. Channel types of the to-be-processed image may include red, green, blue (RGB) channels, YUV (Luminance, Chrominance-Blue Projection, Chrominance-Red Projection) channels, HVS channels, cyan, magenta, yellow, key (CMYK) channels, and the like.

In an example application, if the channel type of the to-be-processed image is YUV, the to-be-processed image has three channels, that is, may be decomposed into a Y channel, a U channel, and a V channel. The Y channel represents luminance, and the U channel and the V channel represent chrominance. In this embodiment, the Y channel may be set as the first channel, and the U channel is set as the second channel. It should be noted that the first channel includes but is not limited to the Y channel, and the second channel includes but is not limited to the U channel.

In this embodiment, the channel decomposition is performed on the to-be-processed image to obtain the plurality of channels, so that the watermark information and the location information can be subsequently embedded into the different channels of the to-be-processed image, thereby implementing decoupling of the watermark information and the location information.

Step S206: Embed watermark information into the first channel to obtain a first channel including the watermark information.

The watermark information refers to a specific identifier embedded in a digital media (for example, a video) to indicate a source, a copyright ownership, or other related information of the digital media. The watermark information may be a character, an image, a logo, a digital sequence, or an identifier in another form.

In an example application, as shown in FIG. 8, in a case in which the channel type of the to-be-processed image is YUV, and channels are decomposed into a Y channel (a first channel), a U channel (a second channel), and a V channel (a third channel), the watermark information may be embedded into the Y channel, to obtain a Y channel including the watermark information. Specifically, a layer corresponding to the Y channel may be sent to a watermark encoder, and the Y channel including the watermark information is output by using the watermark encoder.

Step S208: Embed location information into the second channel to obtain a second channel including the location information.

The location information is relative location information of the to-be-processed image in the target frame image. In this embodiment, the watermark is embedded into the to-be-processed image. Therefore, the location information may be used to indicate location information of the watermark.

In an example application, in a case in which the channel type of the to-be-processed image is YUV, and channels are decomposed into a Y channel, a U channel, and a V channel, the location information may be embedded into the U channel, to obtain a U channel including the location information.

The location information may be calibrated by using anchor point information, and the following provides an optional embodiment.

Figure 3:
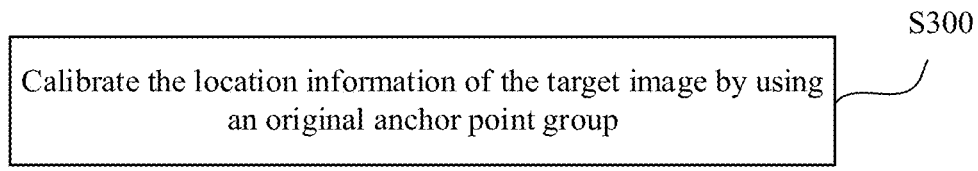
FIG. 3 is a schematic flowchart of a sub-step of step S208 in FIG. 2.

In an optional embodiment, as shown in FIG. 3, the location information includes anchor point information, and step S208 may include the following step:
  S300. Calibrate the location information of the to-be-processed image by using an original anchor point group, where
    the original anchor point group includes a plurality of original anchor points, and the original anchor point is used to indicate the relative location of the to-be-processed image in the target frame image.

The original anchor point is a specific point in the to-be-processed image, and may be used to calibrate the location information of the to-be-processed image.

Location information may be recorded for each to-be-processed image by using one or more groups of original anchor points, and one group of original anchor points may include four or more different categories of original anchor points.

In the foregoing optional embodiment, the location information of the to-be-processed image in the target frame image may be calibrated by using the original anchor point group, and the following effects can be achieved: Precise location calibration can be provided by using the original anchor point group, so that a location of the to-be-processed image in the target frame image can be determined more quickly and effectively. Therefore, when a decoding operation is subsequently performed on the image, a location of the watermark in the target frame image can be quickly identified, thereby improving decoding efficiency.

Figure 4:
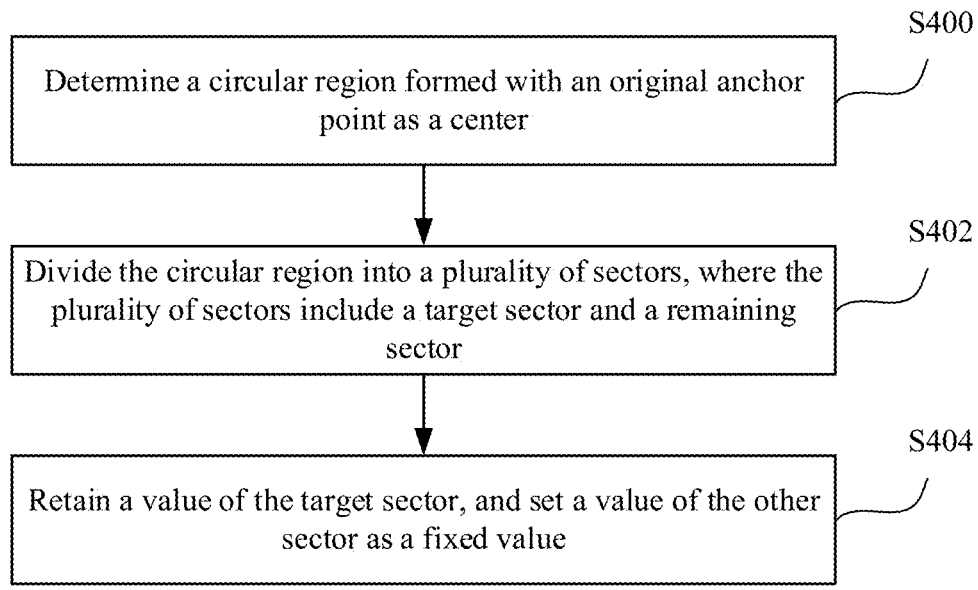
FIG. 4 is a schematic flowchart of sub-steps of step S208 in FIG. 2.

In an optional embodiment, as shown in FIG. 4, step S208 may further include:
  S400. Determine a circular region formed with the original anchor point as a center.
  S402. Divide the circular region into a plurality of sectors, where the plurality of sectors include a target sector and a remaining sector.
  S404. Retain a value of the target sector, and set a value of the remaining sector as a fixed value, where both the value retained for the target sector and the fixed value of the remaining sector are stored in the second channel.

The target sector is a part of the circular region. Specifically, the target sector may be one third of a circle, a quarter of a circle, or one fifth of a circle in the circular region. This is not limited herein.

It should be noted that each original anchor point group may include a plurality of original anchor points, each original anchor point corresponds to one target sector, and shapes of the target sectors of the original anchor points may be different or may be the same. In an example application, the location information of the to-be-processed image in the target frame image may be calibrated by using one original anchor point group, and the original anchor point group may include four different categories of original anchor points. (1) If shapes of the target sectors are the same, shapes of the four anchor points each may be one quarter of the circle of the circular region. (2) If shapes of the target sectors are different, shapes of the four anchor points may be respectively one third of the circle, one quarter of the circle, one fifth of the circle, and one sixth of the circle of the circular region. The shape of each target sector may be selected according to an actual situation. This is not limited herein. In a case in which the shapes of the target sectors are different, a category of each original anchor point in the original anchor point group may be quickly identified according to the shape of each target sector, for example, a radian corresponding to a sector plane of the sector.

In an example application, as shown in FIG. 10, on a basis of retaining the values in the target sector, the value in the remaining sector may be set as the fixed value, for example, 1.

In the foregoing optional embodiment, one target sector is associated with each original anchor point, the values in the target sector are retained, and the value of the remaining sector is set as the fixed value, so that the target sector can be divided from the circular region. That is, an effect of segmenting the target sector from the remaining sector is achieved, so that a location of each original anchor point can be quickly identified from the target frame image according to a numerical characteristic of the target sector, and the location of the watermark in the video can be quickly determined.

Figure 5:
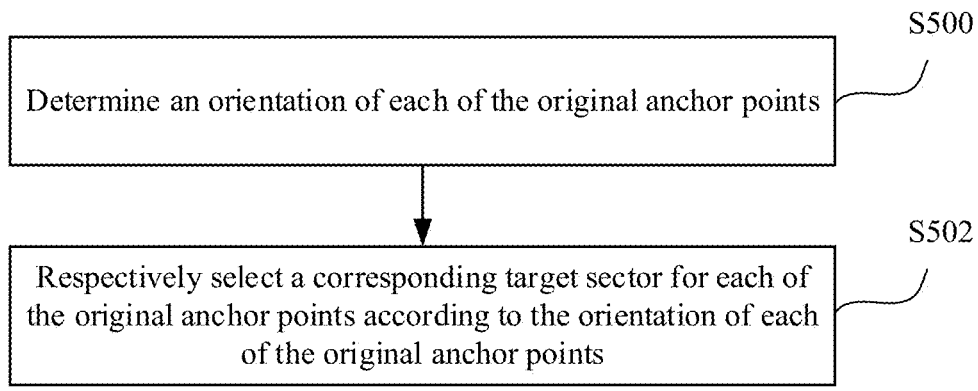
FIG. 5 is a schematic flowchart of sub-steps of step S208 in FIG. 2.

In an optional embodiment, as shown in FIG. 5, step S208 may further include:
  S500. Determine an orientation of each of the original anchor points.
  S502. Respectively select a corresponding target sector for each of the original anchor points according to the orientation of each of the original anchor points.

In an example application, before the corresponding target sector is respectively selected for each original anchor point, it is necessary to first determine the orientation of each original anchor point. As shown in FIG. 9 and FIG. 10, the to-be-processed image includes one anchor point group, and the anchor point group includes four anchor points. For observation in a clockwise direction, orientations of the four anchor points in the to-be-processed image are as follows: (1) An anchor point ① is located in an upper right corner of the to-be-processed image. (2) An anchor point ② is located in a lower right corner of the to-be-processed image. (3) An anchor point ③ is located in a lower left corner of the to-be-processed image. (4) An anchor point ④ is located in an upper left corner of the to-be-processed image.

The target sector may be determined according to the orientation of the original anchor point. In an example application, a sector that is diagonal to the orientation of the original anchor point may be selected, and a size of the sector may be ¼ of a circle. A circular region corresponding to each anchor point is divided into four quadrants, and a horizontal direction is an x-axis and a vertical direction is a y-axis. Target sectors of the four anchor points are specifically as follows: (1) A target sector of the anchor point ① is a sector located in a third quadrant. (2) A target sector of the anchor point ② is a sector located in a second quadrant. (3) A target sector of the anchor point ③ is a sector located in a first quadrant. (4) A target sector of the anchor point ④ is a sector located in a fourth quadrant.

In the foregoing optional embodiment, the corresponding target sector is selected according to the orientation of each original anchor point. In a case in which the orientations of the original anchor points are different, an orientation of each target sector relative to the (associated) original anchor point is also inconsistent. In this way, the following benefits are obtained: A category of each anchor point in the original anchor point group can be quickly and accurately determined according to the orientation of each target sector relative to the original anchor point, thereby quickly and accurately identifying the location and a placement orientation of the watermark.

In an example application, as shown in FIG. 11, a specific embedding process of the location information may be as follows: Information of an original anchor point group corresponding to a to-be-embedded watermark is set, for example, a quantity, a location, a shape, and a value. A dot product of a layer corresponding to the second channel and the set information of the original anchor point group is calculated pixel by pixel, to obtain the second channel including the location information. The original anchor point may be represented in a plurality of forms, such as a Gaussian kernel and a circular mean kernel.

The original anchor point may be represented by a circular mean kernel. When the original anchor point is represented by a circular mean kernel, the circular region with the original anchor point as a center is formed. In this circular region, values are a same fixed value, for example, 0.4 or 0.5. When the target sector is determined, some sectors in the circular region may be captured as a category of anchor points.

Figure 6:
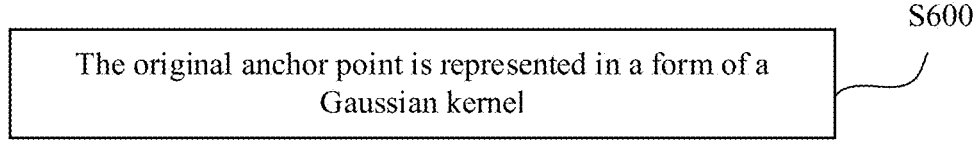
FIG. 6 is a schematic flowchart of a sub-step of step S208 in FIG. 2.

The original anchor point may be represented by a Gaussian kernel. In an optional embodiment, as shown in FIG. 6, the original anchor point is represented in a form of the Gaussian kernel.

In an optional embodiment, as shown in FIG. 7, categories of the original anchor points are different, and the categories of the original anchor points include Gaussian-like kernels with different value distributions and different sectors.

In an example application, as shown in FIG. 9, FIG. 10, and FIG. 12, each original anchor point group includes four original anchor points, that is, each original anchor point group includes four Gaussian-like kernels with different value distributions. The original anchor point group calibrates the location information of the target image by using the four Gaussian-like kernels with the different value distributions. The value of the original anchor point is calculated by using the following formulas:

$$G(u, v) = \frac{1}{2\pi\sigma^2} e^{-\frac{u^2+v^2}{2\sigma^2}} \quad \text{Formula (1)}$$

$$achr_i = 1 - p_i * \frac{G}{\max(G)} \quad \text{Formula (2)}$$

Formula (1) is a formula of the Gaussian kernel, and Formula (2) is a formula of the Gaussian-like kernel. In the foregoing formula, u,v: represents coordinates in different directions; G represents a two-dimensional Gaussian kernel, and a form of the two-dimensional Gaussian kernel is controlled by $\sigma$; $achr_i$ represents an ith anchor point in a group of anchor points, and $p_i$ controls a value distribution of the anchor point, with a value in an open interval from 0 to 1; and max(G) represents a maximum value in G. A location of an original anchor point is image pixel coordinates in which a minimum value of the anchor point is located.

In the foregoing optional embodiment, (1) The original anchor point is represented in the form of the Gaussian kernel. A value in the Gaussian kernel is a Gaussian value, and the Gaussian value is presented in a gradually varying manner. Therefore, when the location of the to-be-processed image is calibrated by using the original anchor point, that is, when the Gaussian kernel is embedded into the to-be-processed image, an impact on picture quality of the to-be-processed image is relatively slight, thereby better ensuring invisibility of the watermark in the to-be-processed image. In addition, the value in the Gaussian kernel is presented in the gradually varying manner, and this value feature may be easily identified by a location information decoder, an anchor point detector, and the like. Therefore, in a subsequent watermark decoding process, the original anchor point represented in the form of the Gaussian kernel can be quickly identified, so that a watermark corresponding to the original anchor point group can be quickly identified. (2) The categories of the original anchor points include the Gaussian-like kernels with the different value distributions and the different sectors. When the original anchor point group is embedded into the to-be-processed image, information such as a value distribution and a sector shape and orientation that are of the Gaussian-like kernel may be changed to embed different anchor points into the to-be-processed image. It may be learned that the category of the original anchor point can be quickly determined by determining a value of the Gaussian-like kernel and a shape of a sector corresponding to the Gaussian-like kernel.

Step S210: Generate a target image corresponding to the to-be-processed image according to the first channel including the watermark information and the second channel including the location information.

The generated target image is a watermarked target image.

Figure 13:
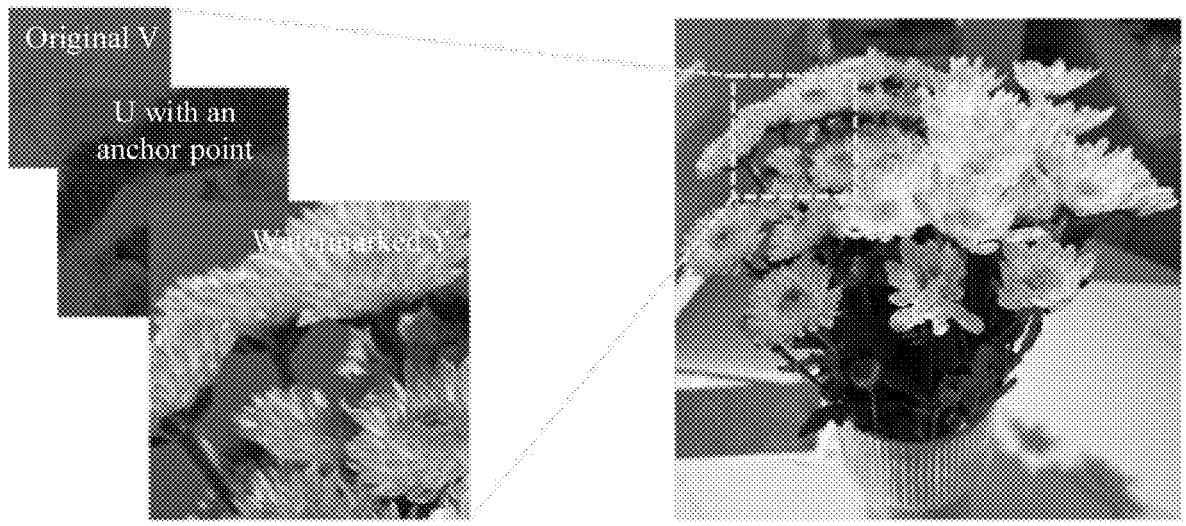
FIG. 13 is a schematic diagram of combining a plurality of channels and embedding a target image into a target frame image according to Embodiment 1 of this application.

When the target image corresponding to the to-be-processed image is generated, it is necessary to combine all decomposed channels. For example, as shown in FIG. 13, in a case in which the channel type of the to-be-processed image is YUV, and channels are decomposed into a Y channel, a U channel, and a V channel, the watermark information may be embedded into the Y channel, to obtain a Y channel including the watermark information. The location information may be embedded into the U channel to obtain a U channel including the location information. The Y channel including the watermark information, the U channel including the location information, and the original V channel are combined to generate the watermarked target image.

Step S212: Embed the target image into the target frame image to obtain a watermarked video.

To add the watermark to the target frame image, in this embodiment, the local/partial image in the target frame image is captured to perform watermark embedding. In this way, when the watermark is embedded into the target frame image, it is not necessary to perform, on the entire target frame image, operations such as adding the watermark information and the location information, and it only needs to embed the watermark into a part of the target frame image (e.g., a segment of the target frame), thereby increasing a watermark encoding speed and reducing hardware computing power consumption. After the watermarked target image is obtained, because the target image is captured from the target frame image, it is necessary to put the captured target image back into the target frame image, to obtain a watermarked target frame image and further obtain the to-be-watermarked video.

When the user uploads the video to the platform, the platform adds the watermark to the uploaded video to obtain the watermarked video. By using this watermark, it can ensure a legal use of the video, protect the legitimate rights and interests of the creator and the platform, and provide reliable data tracing and evidence. It should be noted that the user may also add the watermark on a terminal of the user.

Embodiment 2

It should be noted that a difference between this embodiment and Embodiment 1 is that a sequence of channel decomposition and local image capture is different. For specific implementation details and technical effects of this embodiment, refer to Embodiment 1. Details are not described herein again.

A video watermark encoding method is provided and the method includes:
- obtaining a target frame image of a video;
- performing channel decomposition on the target frame image to obtain a plurality of channels, where the plurality of channels include a first channel and a second channel;
- capturing a first image block from the first channel, where the first image block is a local image block in a layer corresponding to the first channel;
- embedding watermark information into the first image block to obtain a first channel including the watermark information;
- capturing a second image block from the second channel, where a location of the second image block corresponds to that of the first image block;
- embedding location information into the second image block to obtain a second channel including the location information; and
- generating a watermarked target frame image according to the first channel including the watermark information and the second channel including the location information.

In some embodiments, channel decomposition may be first performed on the target frame image to obtain the plurality of channels. Then, the to-be-processed image is captured from the plurality of channels after the plurality of channels are obtained. Specifically, channel decomposition is performed on the target frame image to obtain the plurality of channels (including the first channel and the second channel). One or more first image blocks of a fixed size are selected from the first channel, and the watermark information is embedded into the first image block to obtain the first channel including the watermark information. Then, a second image block corresponding to a location of the to-be-processed image is captured from the second channel, and the location information is embedded into the second image block to obtain the second channel including the location information. A to-be-watermarked image corresponding to the target frame image is generated according to the first channel including the watermark information and the second channel including the location information.

The foregoing embodiments describe the video watermark encoding method in this application, and the following describes a video watermark decoding method according to this application.

Embodiment 3

Figure 14:
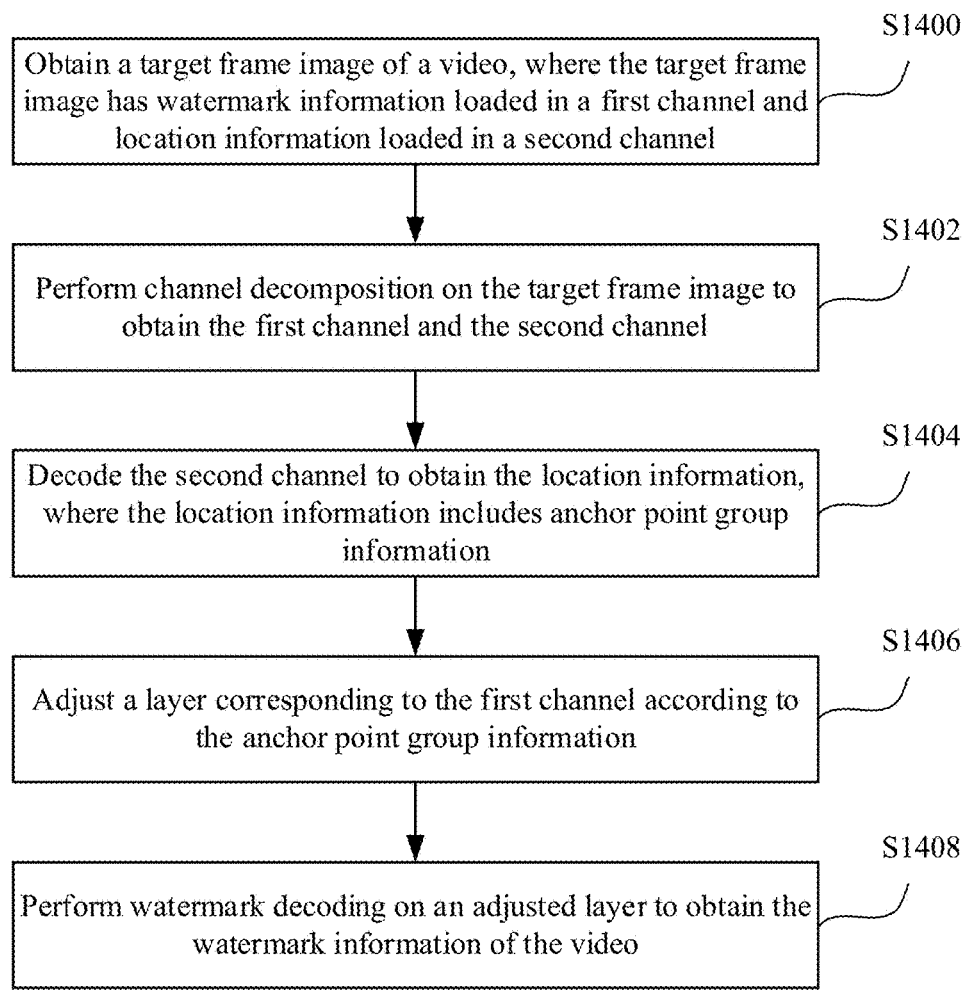
FIG. 14 is a schematic flowchart of a video watermark decoding method according to Embodiment 3 of this application.

FIG. 14 is a schematic flowchart of a video watermark decoding method according to Embodiment 3 of this application.

Figure 18:
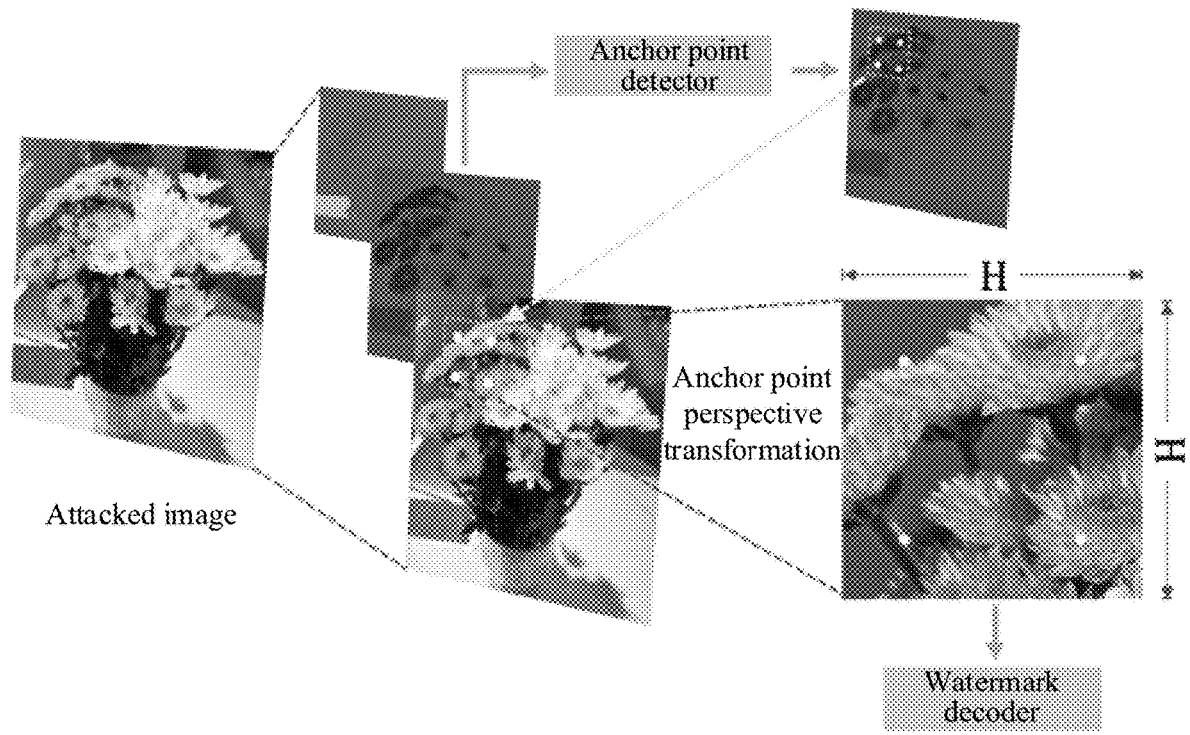
FIG. 18 is a schematic diagram of an image watermark decoding process after a geometric transformation attack according to Embodiment 3 of this application.

As shown in FIG. 14 and FIG. 18, the video watermark decoding method may include steps S1400 to S1408.

S1400. Obtain a target frame image of a video, where the target frame image has watermark information loaded in a first channel and location information loaded in a second channel.

S1402. Perform channel decomposition on the target frame image to obtain the first channel and the second channel.

S1404. Decode the second channel to obtain the location information, where the location information includes anchor point group information.

S1406. Adjust a layer corresponding to the first channel according to the anchor point group information.

S1408. Perform watermark decoding on an adjusted layer to obtain the watermark information of the video.

According to the video watermark decoding method provided in this embodiment, when decoding is performed on a watermarked video (where the watermark information is loaded in the first channel and the location information is loaded in the second channel), channel decomposition is first performed on the target frame image to obtain the first channel and the second channel. Location information of an anchor point group in the target frame image is parsed from the second channel, and then a watermark in the first channel is adjusted according to the location information. Then, an adjusted watermark is decoded to obtain correct and valid watermark information. It may be learned that, based on that the target frame image has the watermark information loaded in the first channel and the location information loaded in the second channel, an orientation, a size, and the like of the watermark may be adjusted according to the location information parsed from the second channel. Therefore, even if the video undergoes a geometric transformation operation, accurate watermark information can be quickly and effectively extracted from the video according to the technical solution of this application, thereby improving robustness of watermark decoding.

With reference to FIG. 14, steps in step S1400 to S1408 and optional other steps are described in detail in the following.

S1400. Obtain a target frame image of a video, where the target frame image has watermark information loaded in a first channel and location information loaded in a second channel.

The video is a to-be-decoded video, and the to-be-decoded video includes the watermark. Specifically, the target frame image in the video has the watermark information loaded in the first channel and the location information loaded in the second channel. For example, if both a video A and a video B include watermark information, and the video A is found to be suspected of infringing the video B. To determine whether the video A infringes the video B, watermark decoding may be performed on the video A, and the watermark information may be parsed from the video A. A video watermark parsed from the video A is compared with a video watermark parsed from the video B. If the two are consistent, it is determined that the video A infringes the video B. If the two are inconsistent, it is determined that the video A does not infringe the video B.

Channel types of the target frame image may include red, green, blue (RGB) channels, YUV channels, HVS channels, cyan, magenta, yellow, key (CMYK) channels, and the like. In an example application, if the channel type of the target frame image is YUV, a Y channel is the first channel, and a U channel is the second channel. In this target frame image, the watermark information is loaded in the Y channel and the location information is loaded in the U channel.

In this embodiment, the watermark information and the location information are respectively embedded into different channels of the target frame image, to decouple the watermark information and the location information, so that the watermark information in the first channel can be subsequently adjusted according to the location information parsed from the second channel.

S1402. Perform channel decomposition on the target frame image to obtain the first channel and the second channel.

For example, if the channel type of the target frame image is YUV, the watermark information is loaded in a Y channel of the target frame image, and the location information is loaded in a U channel, channel decomposition is performed on the target frame image, and three channels, namely, the Y channel, the U channel, and a V channel, can be obtained. The Y channel is the first channel. The U channel is the second channel.

S1404. Decode the second channel to obtain the location information, where the location information includes anchor point group information.

The location information is location information of the watermark in the target image frame. By decoding the second channel, one or more groups of anchor point group information may be obtained. The location information of the watermark is specified by using the one or more groups of anchor point group information.

Each group of anchor points may include four or more anchor points. Categories of the anchor points are different. When the anchor point is a Gaussian anchor point, the categories of the anchor points include Gaussian-like kernels with different value distributions and different sectors.

In this embodiment, the location information of the watermark in the first channel is calibrated by using the anchor point group information. After a geometric transformation occurs on the video, an image corresponding to the watermark can be quickly adjusted according to the anchor point group information detected from the second channel, to restore an original orientation and size.

In some embodiments, the second channel is decoded, and if no anchor point group information is obtained, the target frame image is an unwatermarked image.

Figure 15:
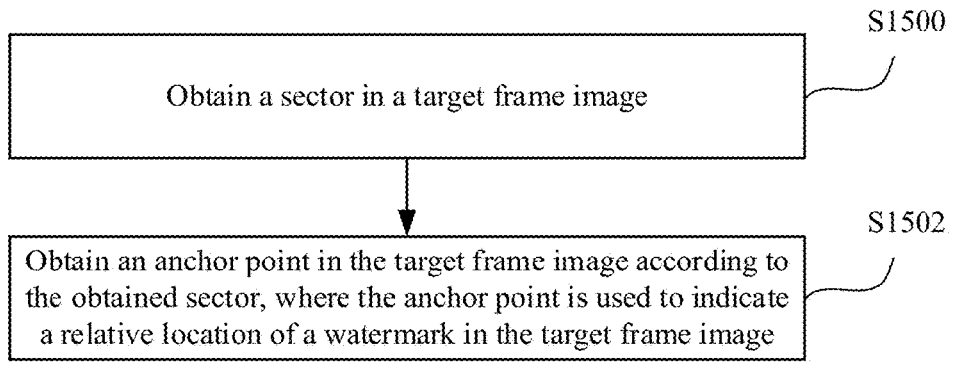
FIG. 15 is a schematic flowchart of sub-steps of step S1404 in FIG. 14.

In an optional embodiment, as shown in FIG. 15, an anchor point group includes a plurality of anchor points, and each anchor point corresponds to one sector.

Correspondingly, step S1404 may include:

S1500. Obtain a sector in the target frame image.

S1502. Obtain an anchor point in the target frame image according to the obtained sector, where the anchor point is used to indicate a relative location of the watermark in the target frame image.

Each anchor point corresponds to one circular region. When the watermark is embedded into the target frame image, one sector is selected for each anchor point, and the sector is a part of the circular region, for example, may be one quarter of a circle or one fifth of the circle of the circular region. Therefore, when the second channel in the target frame image is decoded, anchor point information of the watermark can be obtained according to the sector in the target frame image, and one sector corresponds to one anchor point. For example, if an anchor point is represented in a form of a Gaussian kernel, and a category of the anchor point is presented by using Gaussian-like kernels with different value distributions and different sectors, coordinates of an image pixel in which a minimum value in values of the sector is located are a location of the anchor point.

When the second channel is decoded, an anchor point is obtained according to the sector. When a plurality of anchor points are detected, categories of the anchor points are determined, to determine a location of the anchor point in the target frame image before the geometric transformation is performed. When the category of the anchor point is identified, the following information may be used for determining: (1) An angle of the sector, for example, a radian corresponding to a sector plane of the sector. For example, a radian of one third of the circular region is 120°, and a radian of one quarter of the circular region is 90°. (2) A value of each point in the sector may be determined according to a value (the minimum value) of the anchor point in the sector. (3) An orientation of the sector. As shown in FIG. 9 described above, when the target sector is one quarter of the circle, a radian corresponding to a sector plane of the anchor point ① is toward a lower left corner relative to the anchor point ①, and a radian corresponding to a sector plane of the anchor point ② is toward an upper left corner relative to the anchor point ②.

In the foregoing optional embodiment, the anchor point is represented in a form of the sector, and the location and the category of the anchor point can be quickly determined by using a characteristic of the sector (for example, the angle/the radian, the value, and the orientation), to quickly indicate the relative location of the watermark in the target frame image.

S1406. Adjust a layer corresponding to the first channel according to the anchor point group information.

Figure 17:
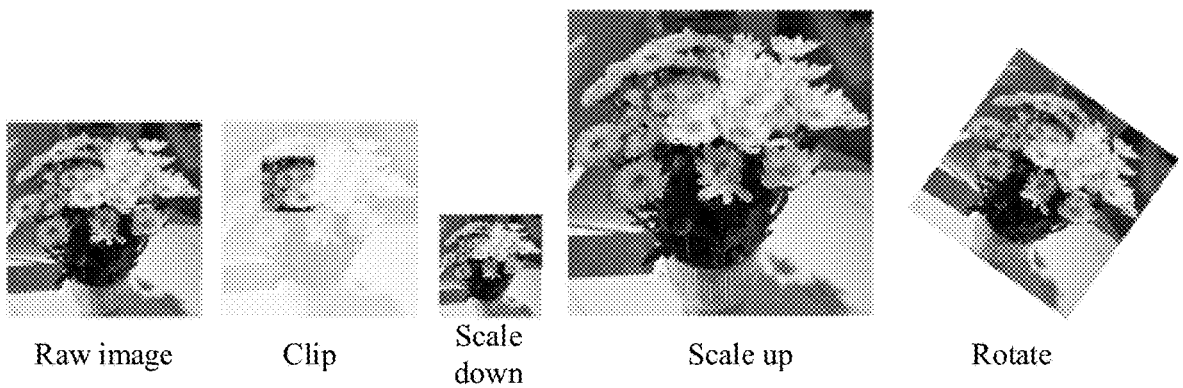
FIG. 17 is a schematic diagram of a target frame image obtained after a geometric transformation operation according to Embodiment 3 of this application.

As shown in FIG. 17, a picture of the video including the watermark information may change in a process of being infringed. For example, when the video including the watermark information is infringed, the following geometric transformation operations may be performed: scaling, clipping, rotation, and the like. After the foregoing operation, a picture location of the target frame image including the watermark information changes. In this case, it greatly increases a difficulty of watermark decoding. Therefore, to correctly and quickly decode the watermark information, the layer corresponding to the first channel may be adjusted according to the location information (the anchor point group information), and the target frame image is restored to the original orientation and size.

Figure 16:
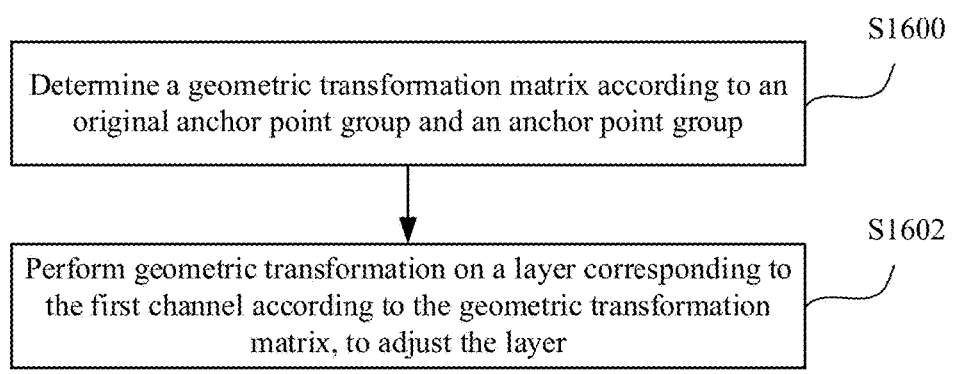
FIG. 16 is a schematic flowchart of sub-steps of step S1406 in FIG. 14.

In an optional embodiment, as shown in FIG. 16, step S1406 may include:

S1600. Determine a geometric transformation matrix according to an original anchor point group and an anchor point group.

S1602. Perform a geometric transformation on the layer corresponding to the first channel according to the geometric transformation matrix, to adjust the layer.

The original anchor point group is an anchor point group for which the video has not undergone the geometric transformation operation. In an example application, if both the video A and the video B are embedded with watermarks, and the video A is found to be suspected of infringing the video B, the original anchor point group is theoretically consistent with an anchor point group of the video B. In this case, an anchor point group of the video A may be obtained by using a second channel of the video A. A corresponding geometric transformation matrix may be determined according to the anchor point group of the video A and the anchor point group of the video B. A geometric transformation is performed on a layer of a first channel in the video A according to the geometric transformation matrix, to adjust the layer.

In the foregoing optional embodiment, the corresponding geometric transformation matrix is determined according to a location of the original anchor point group and a location of the anchor point group obtained by decoding the second channel. The geometric transformation matrix is applied to the layer corresponding to the first channel, and the geometric transformation is performed on the layer, so that an orientation and a size of a layer corresponding to the second channel can be quickly and accurately restored, that is, an orientation and a size of the watermark in the second channel can be quickly and accurately restored, to perform infringement identification.

S1408. Perform watermark decoding on an adjusted layer to obtain the watermark information of the video.

The adjusted layer is input to a watermark decoder for decoding, to obtain the watermark information of the video. According to the watermark information, it may be determined whether the video is infringing. If the watermark of the video is the same as a watermark of an infringed video, the video may be considered as infringing. If the watermark of the video is different from the watermark of the infringed video, there is no infringement.

The foregoing embodiment describes the video watermark decoding method in this application, and the following describes a training process of a location information decoder in this embodiment.

Figure 19:
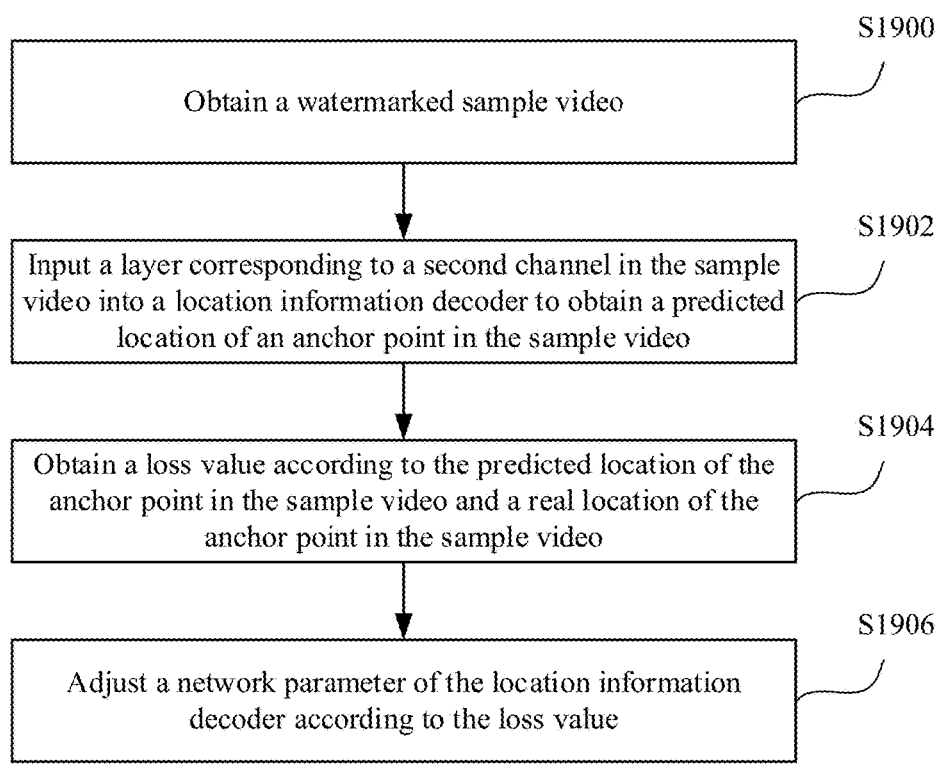
FIG. 19 is a schematic flowchart of training a location information decoder.

In an optional embodiment, as shown in FIG. 19, an anchor point is detected by using the location information decoder. The location information decoder is trained through the following operations:

S1900. Obtain a watermarked sample video.

S1902. Input a layer corresponding to a second channel in the sample video into the location information decoder to obtain a predicted location of an anchor point in the sample video.

S1904. Obtain a loss value according to the predicted location of the anchor point in the sample video and a real location of the anchor point in the sample video.

S1906. Adjust a network parameter of the location information decoder according to the loss value.

For example, if a channel type of an image frame in the sample video is YUV, and a U channel is a second channel, a layer corresponding to the U channel is input to the location information decoder, and the location information decoder outputs location information of one or more groups of anchor points. The location information of each group of anchor points includes pixel coordinates of each anchor point in the group of anchor points.

In the foregoing optional embodiment, by training the location information decoder, the trained location information decoder can more accurately predict location information of an anchor point group, to quickly and accurately decode watermark information.

Figure 20:
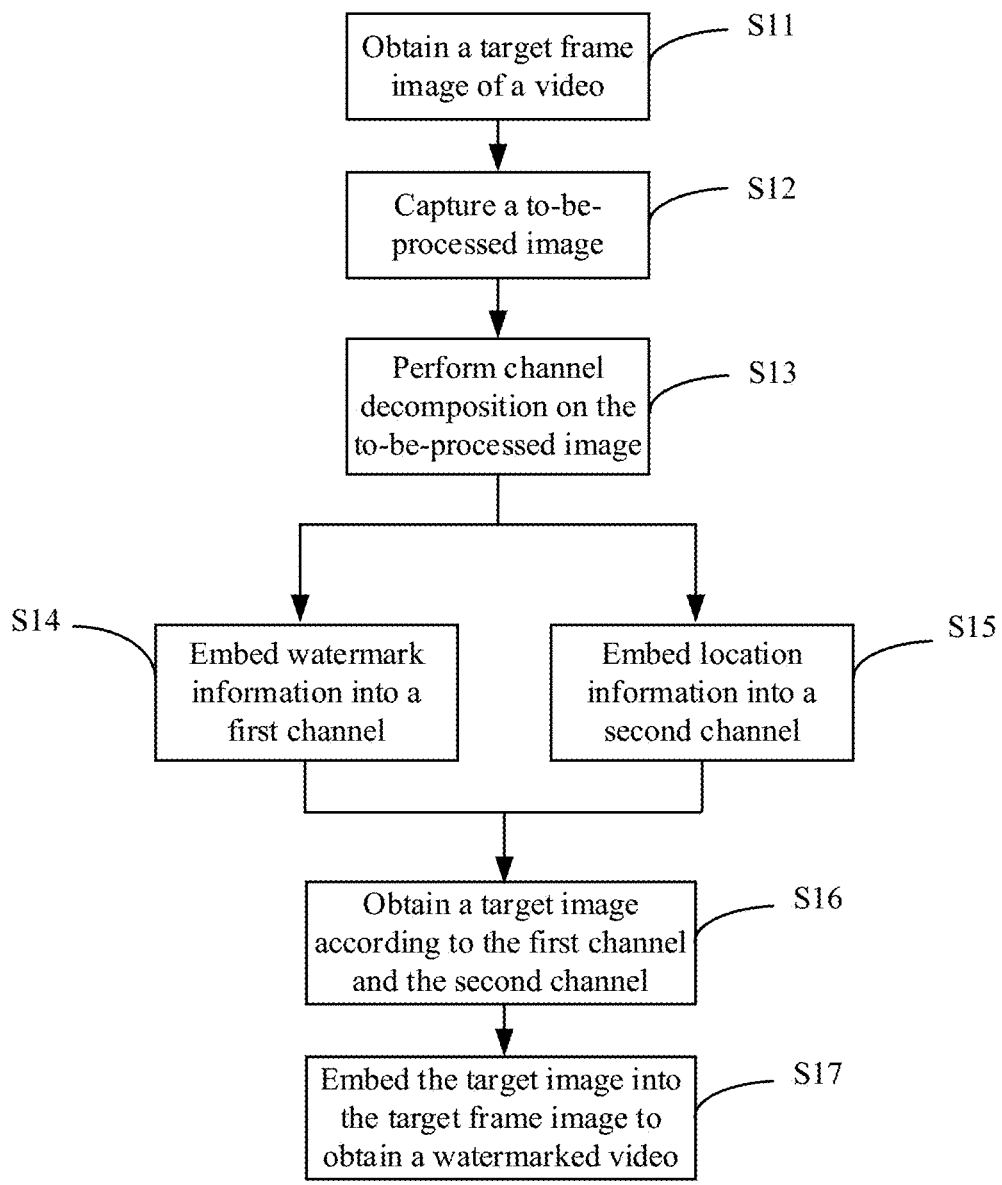
FIG. 20 is a schematic flowchart of applying a video watermark encoding method.
Figure 21:
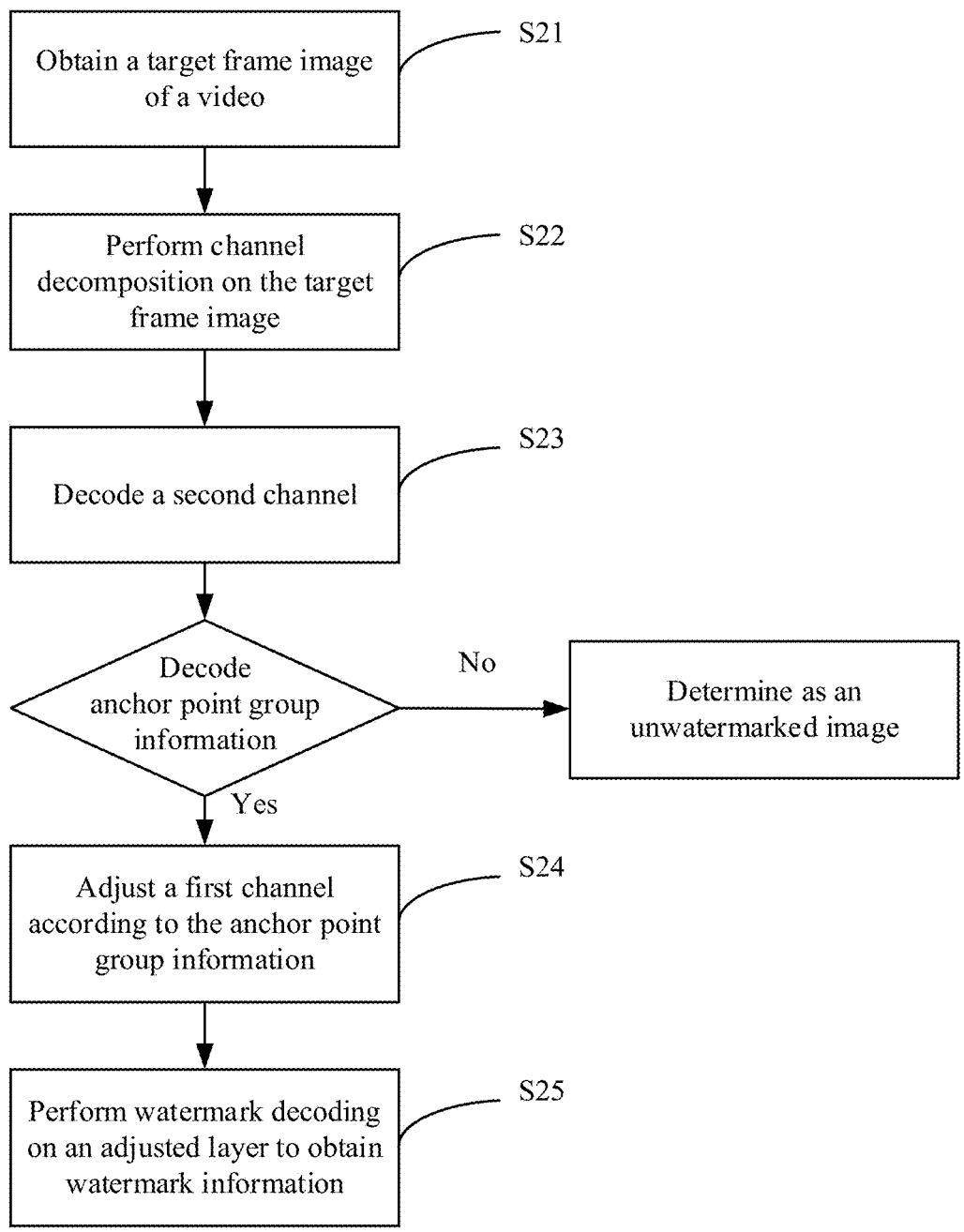
FIG. 21 is a schematic flowchart of applying a video watermark decoding method.

To make this application easier to understand, the following provides an example application with reference to FIG. 20 and FIG. 21.

(1) Video watermark encoding method:
S11. Obtain a target frame image of a video.
S12. Capture a to-be-processed image from the target frame image, where the to-be-processed image is a local image block of the target frame image.
S13. Perform channel decomposition on the to-be-processed image.
S14. Embed watermark information into a first channel. Specifically:
S141. Calibrate location information of the to-be-processed image by using an original anchor point group.
S142. Determine a circular region formed with an original anchor point as a center, and divide the circular region into a plurality of sectors.
S143. Select a corresponding target sector for each original anchor point according to an orientation of each original anchor point.
S144. Retain a value of the target sector, and set a value of other sector as a fixed value, where the original anchor point is represented in a form of a Gaussian kernel, and categories of the original anchor points include Gaussian-like kernels with different value distributions and different sectors.
S15. Embed location information into a second channel.
S16. Generate a target image according to the first channel and the second channel.
S17. Embed the target image into the target frame image to obtain a watermarked video.

(2) Video watermark decoding method:
S21. Obtain a target frame image of a video, where the target frame image has watermark information and location information loaded in different channels.
S22. Perform channel decomposition on the target frame image to obtain a first channel and a second channel.
S23. Decode the second channel to obtain the location information (anchor point group information).
Specifically:
S231. Obtain a sector in the target frame image.
S232. Obtain an anchor point in the target frame image according to the obtained sector.
S24. Adjust a layer corresponding to the first channel according to the anchor point group information.
Specifically:
S241. Determine a geometric transformation matrix according to an original anchor point group and an anchor point group.
S242. Perform a geometric transformation on the layer corresponding to the first channel according to the geometric transformation matrix.
S25. Perform watermark decoding on an adjusted layer to obtain the watermark information of the video.

Embodiment 4

Figure 22:
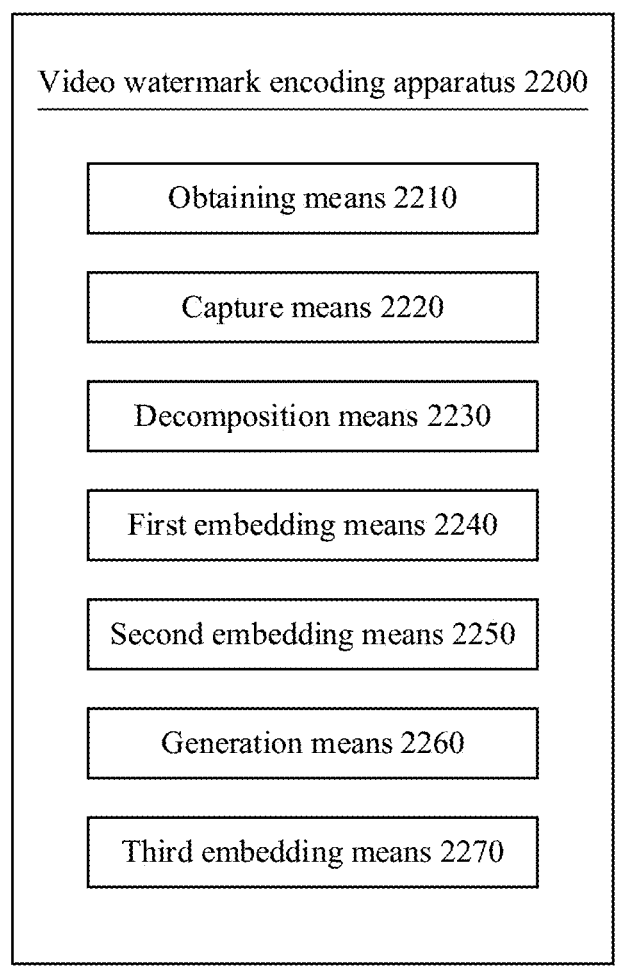
FIG. 22 is a schematic block diagram of a video watermark encoding apparatus according to Embodiment 4 of this application.

FIG. 22 is a schematic block diagram of a video watermark encoding apparatus according to Embodiment 4 of this application. The video watermark encoding apparatus may be divided into one or more program means. The one or more program means are stored in a storage medium and executed by one or more processors, to complete this embodiment of this application. The program means in this embodiment of this application is a series of computer program instruction segments that can be used to complete a specific function. The following specifically describes a function of each program means in this embodiment. As shown in FIG. 22, the video watermark encoding apparatus may include an obtaining means 2210, a capture means 2220, a decomposition means 2230, a first embedding means 2240, a second embedding means 2250, a generation means 2260, and a third embedding means 2270.

The obtaining means 2210 is configured to obtain a target frame image of a video.

The capture means 2220 is configured to capture a to-be-processed image from the target frame image, where the to-be-processed image is a local image block of the target frame image.

The decomposition means 2230 is configured to perform channel decomposition on the to-be-processed image to obtain a plurality of channels, where the plurality of channels include a first channel and a second channel.

The first embedding means 2240 is configured to embed watermark information into the first channel to obtain a first channel including the watermark information.

The second embedding means 2250 is configured to embed location information into the second channel to obtain a second channel including the location information.

The generation means 2260 is configured to generate a target image corresponding to the to-be-processed image according to the first channel including the watermark information and the second channel including the location information.

The third embedding means 2270 is configured to embed the target image into the target frame image to obtain a watermarked video.

In an optional embodiment, the location information includes anchor point information.

Correspondingly, the second embedding means 2250 is further configured to:
 calibrate the location information of the to-be-processed image by using an original anchor point group, where the original anchor point group includes a plurality of original anchor points, and the original anchor point is used to indicate a relative location of the to-be-processed image in the target frame image.

In an optional embodiment, the second embedding means 2250 is further configured to:
 determine a circular region formed with the original anchor point as a center;
 divide the circular region into a plurality of sectors, where the plurality of sectors include a target sector and a remaining sector; and
 retain a value of the target sector, and set a value of the remaining sector as a fixed value, where
 both the value retained for the target sector and the fixed value of the remaining sector are stored in the second channel.

In an optional embodiment, there are four original anchor points, and the second embedding means 2250 is further configured to:
 determine an orientation of each of the original anchor points; and
 respectively select a corresponding target sector for each of the original anchor points according to the orientation of each of the original anchor points.

In an optional embodiment, the original anchor point is represented in a form of a Gaussian kernel.

In an optional embodiment, categories of the original anchor points are different, and categories of the original anchor points include Gaussian-like kernels with different value distributions and different sectors.

In an optional embodiment, the video watermark encoding apparatus may further include:
 an obtaining means, configured to obtain a target frame image of a video;
 a decomposition means, configured to perform channel decomposition on the target frame image to obtain a plurality of channels, where the plurality of channels include a first channel and a second channel;
 a first capture means, configured to capture a first image block from the first channel, where the first image block is a local image block in a layer corresponding to the first channel;
 a first embedding means, configured to embed watermark information into the first image block to obtain a first channel including the watermark information;
 a second capture means, configured to capture a second image block from the second channel, where a location of the second image block corresponds to that of the first image block;
 a second embedding means, configured to embed location information into the second image block to obtain a second channel including the location information; and
 a generation means, configured to generate a watermarked target frame image according to the first channel including the watermark information and the second channel including the location information.

Embodiment 5

Figure 23:
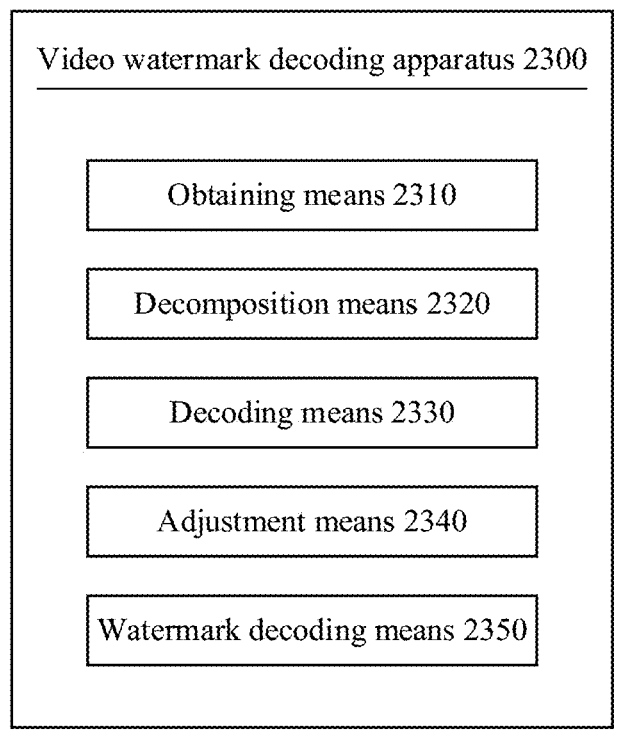
FIG. 23 is a schematic block diagram of a video watermark decoding apparatus according to Embodiment 5 of this application.

FIG. 23 is a schematic block diagram of a video watermark decoding apparatus according to Embodiment 5 of this application. The video watermark decoding apparatus may be divided into one or more program means. The one or more program means are stored in a storage medium and executed by one or more processors, to complete this embodiment of this application. The program means in this embodiment of this application is a series of computer program instruction segments that can be used to complete a specific function. The following specifically describes a function of each program means in this embodiment. As shown in FIG. 23, the video watermark decoding apparatus may include an obtaining means 2310, a decomposition means 2320, a decoding means 2330, an adjustment means 2340, and a watermark decoding means 2350.

The obtaining means 2310 is configured to obtain a target frame image of a video, where the target frame image has watermark information loaded in a first channel and location information loaded in a second channel.

The decomposition means 2320 is configured to perform channel decomposition on the target frame image to obtain the first channel and the second channel.

The decoding means 2330 is configured to decode the second channel to obtain the location information, where the location information includes anchor point group information.

The adjustment means 2340 is configured to adjust a layer corresponding to the first channel according to the anchor point group information.

The watermark decoding means 2350 is configured to perform watermark decoding on an adjusted layer to obtain the watermark information of the video.

In an optional embodiment, an anchor point group includes a plurality of anchor points, and each anchor point corresponds to one sector.

The video watermark decoding apparatus further includes a second obtaining means (unidentified), configured to:
 obtain a sector in the target frame image; and
 obtain an anchor point in the target frame image according to the obtained sector, where the anchor point is used to indicate a relative location of a watermark in the target frame image.

In an optional embodiment, the adjustment means is further configured to:
 determine a geometric transformation matrix according to the original anchor point group and the anchor point group; and
 perform geometric transformation on the layer corresponding to the first channel according to the geometric transformation matrix, to adjust the layer.

In an optional embodiment, an anchor point is detected by using a location information decoder.

The apparatus further includes a training means (not identified), and the training means is configured to:
obtain a watermarked sample video;
input a layer corresponding to a second channel in the sample video into the location information decoder to obtain a predicted location of an anchor point in the sample video;
obtain a loss value according to the predicted location of the anchor point in the sample video and a real location of the anchor point in the sample video; and
adjust a network parameter of the location information decoder according to the loss value.

Embodiment 6

Figure 24:
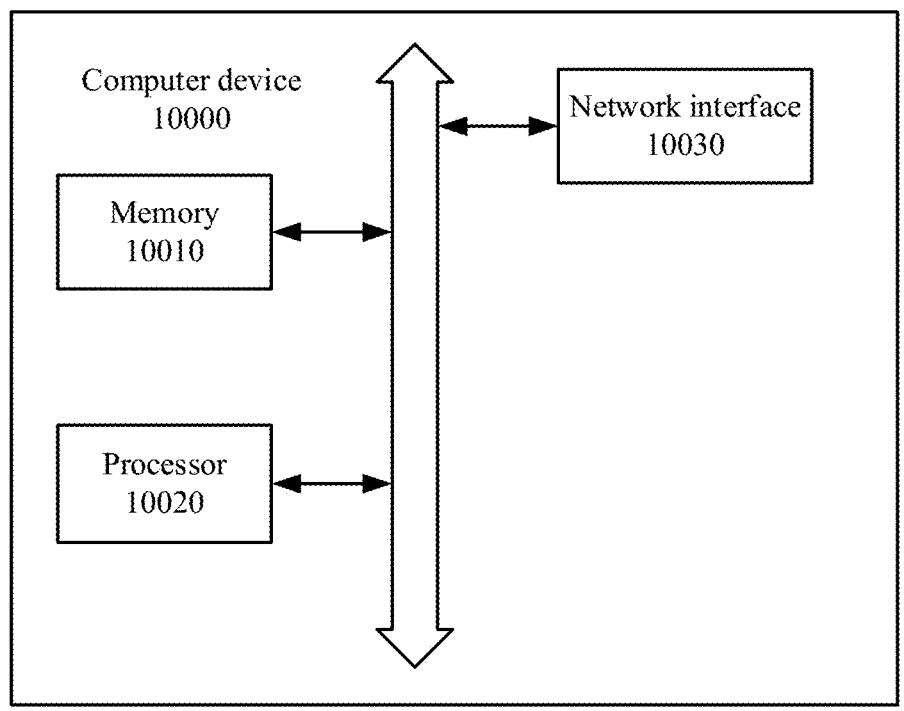
FIG. 24 is a schematic diagram of a hardware architecture of a computer device according to Embodiment 6 of this application.

FIG. 24 is a schematic diagram of a hardware architecture of a computer device 10000 suitable for implementing video watermark encoding and decoding methods according to Embodiment 6 of this application. In some embodiments, the computer device 10000 may be a terminal device such as a smartphone, a wearable device, a tablet computer, a personal computer, a vehicle-mounted terminal, a game console, a virtual device, a workbench, a digital assistant, a set-top box, or a robot. In some other embodiments, the computer device 10000 may be a rack server, a blade server, a tower server, a cabinet server (including an independent server, or a server cluster including a plurality of servers), or the like. As shown in FIG. 24, the computer device 10000 includes at least but is not limited to a memory 10010, a processor 10020, and a network interface 10030 that can be communicatively linked to each other by using a system bus.

The memory 10010 includes at least one type of computer-readable storage medium. The readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the memory 10010 may be an internal storage means of the computer device 10000, for example, a hard disk or an internal memory of the computer device 10000. In some other embodiments, the memory 10010 may alternatively be an external storage device of the computer device 10000, for example, a plug-in hard disk, a smart media card (SMC), a secure digital (SD) card, or a flash card (Flash Card) that is disposed on the computer device 10000. Certainly, the memory 10010 may alternatively include both an internal storage means of the computer device 10000 and an external storage device of the computer device 10000. In this embodiment, the memory 10010 is usually configured to store an operating system and various application software that are installed on the computer device 10000, for example, program code of the video watermark encoding and decoding methods. In addition, the memory 10010 may be further configured to temporarily store various types of data that have been output or are to be output.

In some embodiments, the processor 10020 may be a central processing unit (CPU), a controller, a microcontroller, a microprocessor, or another chip. The processor 10020 is usually configured to control an overall operation of the computer device 10000, for example, perform control and processing related to data exchange or communication performed by the computer device 10000. In this embodiment, the processor 10020 is configured to run program code stored in the memory 10010 or process data.

The network interface 10030 may include a wireless network interface or a wired network interface, and the network interface 10030 is usually configured to establish a communication link between the computer device 10000 and another computer device. For example, the network interface 10030 is configured to: connect the computer device 10000 to an external terminal by using a network, and establish a data transmission channel, a communication link, and the like between the computer device 10000 and the external terminal. The network may be a wireless or wired network such as an Intranet, the Internet, a global system for mobile communications (GSM), a wideband code division multiple access (WCDMA), a 4G network, a 5G network, Bluetooth, or Wi-Fi.

It should be noted that FIG. 24 shows only a computer device with the components 10010 to 10030. However, it should be understood that implementation of all the shown components is not required, and more or fewer components may alternatively be implemented.

In this embodiment, the video watermark encoding and decoding methods stored in the memory 10010 may be further divided into one or more program means to be executed by one or more processors (for example, the processor 10020), to complete this embodiment of this application.

Embodiment 7

An embodiment of this application further provides a computer-readable storage medium. The computer-readable storage medium stores a computer program. When the computer program is executed by a processor, the steps of the video watermark encoding and decoding methods in the embodiments are implemented.

In this embodiment, the computer-readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the computer-readable storage medium may be an internal storage unit of a computer device, for example, a hard disk or an internal memory of the computer device. In some other embodiments, the computer-readable storage medium may alternatively be an external storage device of the computer device, for example, a plug-in hard disk, a smart media card (SMC), a secure digital (SD) card, or a flash card that is disposed on the computer device. Certainly, the computer-readable storage medium may alternatively include both an internal storage unit of the computer device and an external storage device of the computer device. In this embodiment, the computer-readable storage medium is usually configured to store an operating system and various application software that are installed on the computer device, for example, program code of the video watermark encoding and decoding methods in the embodiments. In addition, the computer-readable storage medium may be further configured to temporarily store various types of data that have been output or are to be output.

It should be noted that the foregoing descriptions are merely preferred embodiments of this application, and are not intended to limit the patent protection scope of this application. Any equivalent structure or equivalent procedure change made based on the content of this specification and the accompanying drawings of this application is directly or indirectly applied to other related technical fields, and shall fall within the patent protection scope of this application.

What is claimed is:

1. A method of processing video frames, comprising:
obtaining a target frame of a video;
capturing at least one to-be-processed image from the target frame, wherein the at least one to-be-processed image comprises at least one segment of the target frame;
generating a plurality of channels by performing channel decomposition on the to-be-processed image, wherein the plurality of channels comprise a first channel and a second channel;
embedding watermark information indicative of a watermark into the first channel;
embedding location information into the second channel, wherein the location information indicates a location of the watermark in the target frame;
generating a target image corresponding to the to-be-processed image based on the first channel comprising the embedded watermark information and the second channel comprising the embedded location information; and
generating a watermarked video by embedding the target image into the target frame.

2. The method according to claim 1, wherein the location information comprises anchor point information, and wherein the embedding location information into the second channel comprises:
calibrating a relative location of the to-be-processed image in the target frame by using an anchor point group, wherein the anchor point group comprises a plurality of anchor points.

3. The method according to claim 2, further comprising:
determining a circular region formed with each anchor point as a center;
dividing the circular region into a plurality of sectors, wherein the plurality of sectors comprise a target sector and a remaining sector; and
retaining values in the target sector, and setting a fixed value for the remaining sector, wherein both the values retained in the target sector and the fixed value in the remaining sector are stored in the second channel.

4. The method according to claim 3, wherein there are four anchor points, and the method further comprises:
determining an orientation of each of the four original anchor points; and
determining a target sector corresponding to each of the four original anchor points based on the orientation of each of the four original anchor points.

5. The method according to claim 2, wherein each anchor point is represented in a form of a Gaussian kernel.

6. The method according to claim 2, wherein categories of the plurality of anchor points are different, and the categories of the plurality of anchor points comprise Gaussian-like kernels with different value distributions and different sectors.

7. A method of processing video frames, comprising:
obtaining a target frame of the watermarked video of claim 1;
performing channel decomposition on the target frame of the watermarked video to obtain the first channel and the second channel;
decoding the second channel to obtain the location information, wherein the location information comprises anchor point group information indicative of an anchor point group, wherein the anchor point group comprises a plurality of anchor points;
adjusting an image layer corresponding to the first channel based on the anchor point group information; and
extracting the watermark information from the target frame of the watermarked video by performing watermark decoding on the adjusted image layer.

8. The method according to claim 7, wherein each of the plurality of anchor points corresponds to a sector, and wherein the decoding the second channel to obtain the location information comprises:
identifying each sector from the target frame of the watermarked video;
determining a corresponding anchor point in the target frame of the watermarked video based on the identified sector, wherein the plurality of anchor points indicate a relative location of a watermark in the target frame of the watermarked video.

9. The method according to claim 7, wherein the video is suspected of infringing another video, wherein the adjusting an image layer corresponding to the first channel based on the anchor point group information comprises:
determining a geometric transformation matrix based on the anchor point group and another anchor point group of the other video; and
performing geometric transformation on the image layer corresponding to the first channel based on the geometric transformation matrix to adjust the image layer.

10. The method according to claim 7, wherein each anchor point is detected by a location information decoder, and wherein the location information decoder is trained by:
obtaining watermarked sample videos;
inputting an image layer corresponding to a second channel in each sample video into the location information decoder and generating a predicted location of each anchor point in the sample video;
computing a loss value based on the predicted location of the anchor point in the sample video and a real location of the anchor point in the sample video; and
adjusting network parameters of the location information decoder based on the loss value.

11. A computing device, comprising:
at least one processor, and at least one memory communicatively connected to the at least one processor, wherein the at least one memory stores instructions that upon execution by the at least one processor cause the at least one processor to perform operations comprising:
obtaining a target frame of a video;
capturing at least one to-be-processed image from the target frame, wherein the at least one to-be-processed image comprises at least one segment of the target frame;
generating a plurality of channels by performing channel decomposition on the to-be-processed image, wherein the plurality of channels comprise a first channel and a second channel;
embedding watermark information indicative of a watermark into the first channel;
embedding location information into the second channel, wherein the location information indicates a location of the watermark in the target frame;
generating a target image corresponding to the to-be-processed image based on the first channel comprising the embedded watermark information and the second channel comprising the embedded location information; and generating a watermarked video by embedding the target image into the target frame.

12. The computing device according to claim 11, wherein the location information comprises anchor point information, and wherein the embedding location information into the second channel comprises:

calibrating a relative location of the to-be-processed image in the target frame by using an anchor point group, wherein the anchor point group comprises a plurality of anchor points.

13. The computing device according to claim 12, the operations further comprising:

determining a circular region formed with each anchor point as a center;

dividing the circular region into a plurality of sectors, wherein the plurality of sectors comprise a target sector and a remaining sector; and retaining values in the target sector, and setting a fixed value for the remaining sector, wherein both the values retained in the target sector and the fixed value in the remaining sector are stored in the second channel.

14. The computing device according to claim 13, wherein there are four anchor points, and the method further comprises:

determining an orientation of each of the four original anchor points; and determining a target sector corresponding to each of the four original anchor points based on the orientation of each of the four original anchor points.

15. The computing device according to claim 12, wherein each anchor point is represented in a form of a Gaussian kernel.

16. The computing device according to claim 12, wherein categories of the plurality of anchor points are different, and the categories of the plurality of anchor points comprise Gaussian-like kernels with different value distributions and different sectors.

* * * * *